United States Patent
Gundlach et al.

(10) Patent No.: US 12,337,946 B2
(45) Date of Patent: *Jun. 24, 2025

(54) ADDITIVE MANUFACTURED AIRFRAME STRUCTURE HAVING A PLURALITY OF REINFORCEMENT ELEMENTS

(71) Applicant: RapidFlight Holdings, LLC, Manassas, VA (US)

(72) Inventors: John F. Gundlach, Manassas, VA (US); Jacob S. Allen, Hood River, OR (US)

(73) Assignee: RapidFlight Holdings, LLC, Manassas, VA (US)

( * ) Notice: Subject to any disclaimer, the term of this patent is extended or adjusted under 35 U.S.C. 154(b) by 19 days.

This patent is subject to a terminal disclaimer.

(21) Appl. No.: 18/532,324

(22) Filed: Dec. 7, 2023

(65) Prior Publication Data

US 2024/0109639 A1   Apr. 4, 2024

Related U.S. Application Data

(63) Continuation of application No. 18/103,992, filed on Jan. 31, 2023, now Pat. No. 11,840,323, which is a
(Continued)

(51) Int. Cl.
*B64C 1/06* (2006.01)
*B33Y 80/00* (2015.01)
(Continued)

(52) U.S. Cl.
CPC .............. *B64C 1/061* (2013.01); *B33Y 80/00* (2014.12); *B64C 3/24* (2013.01); *B64C 2001/0054* (2013.01)

(58) Field of Classification Search
CPC ........... B64C 1/08; B64C 1/068; B64C 1/061; B64C 2001/0054; B64C 3/24; B64C 3/22; B33Y 80/00
See application file for complete search history.

(56) References Cited

U.S. PATENT DOCUMENTS

| | | | |
|---|---|---|---|
| 1,291,678 | A | 1/1919 | Kleckler |
| 4,244,765 | A | 1/1981 | Tokuno |

(Continued)

FOREIGN PATENT DOCUMENTS

| | | |
|---|---|---|
| AU | 2015284731 B2 | 1/2016 |
| CA | 2693889 C | 1/2016 |

(Continued)

OTHER PUBLICATIONS

McMaster-Carr, Catalog—Composites; downloaded Dec. 21, 2021; website: https://www.mcmaster.com/carbon-fiber/.
(Continued)

*Primary Examiner* — Tye William Abell
(74) *Attorney, Agent, or Firm* — Polsinelli PC

(57) ABSTRACT

An additive manufactured airframe structure includes a first additive manufactured fuselage segment including a first outer wall that extends in a normal direction from a first end to a second end, and also includes a plurality of reinforcement elements extending from the second end of, and away from, the first outer wall in the normal direction. The airframe structure also includes a second additive manufactured fuselage segment formed separately from the first additive manufactured fuselage segment and including a second outer wall that extends in the normal direction from a first end to a second end, and a plurality of receiving channels extending along the second outer wall. The plurality of reinforcement elements are received in the plurality of receiving channels and link together the first and second additive manufactured fuselage segments.

20 Claims, 12 Drawing Sheets

Related U.S. Application Data continuation of application No. 17/559,829, filed on Dec. 22, 2021, now Pat. No. 11,597,490.

(51) Int. Cl.
*B64C 3/24* (2006.01)
*B64C 1/00* (2006.01)

(56) References Cited

U.S. PATENT DOCUMENTS

| | | |
|---|---|---|
| 6,523,781 B2 | 2/2003 | Ragner |
| 7,331,838 B2 | 2/2008 | Shantz |
| 7,963,815 B2 | 6/2011 | Mead |
| 8,286,907 B2 | 10/2012 | Dohi et al. |
| 8,366,055 B2 | 2/2013 | Ulrich et al. |
| 8,640,386 B1 | 2/2014 | Griffith et al. |
| 9,212,032 B2 | 12/2015 | Vander Lind et al. |
| 9,359,817 B2 | 6/2016 | Allred, III et al. |
| 9,599,993 B2 | 3/2017 | Kumar et al. |
| 9,709,026 B2 | 7/2017 | Vander Lind |
| 9,732,731 B2 | 8/2017 | Hachtmann et al. |
| 9,764,820 B2 | 9/2017 | Kinne et al. |
| 9,765,756 B2 | 9/2017 | Hancock |
| 9,784,243 B2 | 10/2017 | Vander Lind et al. |
| 9,803,061 B2 | 10/2017 | Hattori et al. |
| 9,896,201 B2 | 2/2018 | Vander Lind |
| 9,947,434 B2 | 4/2018 | Patten et al. |
| 10,023,307 B2 | 7/2018 | Deng et al. |
| 10,421,538 B2 | 9/2019 | Seale et al. |
| 10,501,605 B2 | 12/2019 | Ichikawa et al. |
| 10,533,537 B2 | 1/2020 | GilroySmith et al. |
| 10,829,229 B2 | 11/2020 | MacCallum et al. |
| 10,850,826 B2 | 12/2020 | Chengalva |
| 10,960,468 B2 | 3/2021 | Czinger et al. |
| 10,967,576 B2 | 4/2021 | Fiechter et al. |
| 10,974,807 B2 | 4/2021 | Grip et al. |
| 11,052,989 B2 | 7/2021 | Livieratos et al. |
| 11,125,206 B2 | 9/2021 | Kudsk |
| 11,353,002 B2 | 6/2022 | Meeks et al. |
| 11,680,555 B2 | 6/2023 | Merzhaeuser et al. |
| 2007/0215750 A1 | 9/2007 | Shantz et al. |
| 2008/0231058 A1 | 9/2008 | Nicholson et al. |
| 2015/0136898 A1 | 5/2015 | McCoy |
| 2015/0284035 A1 | 10/2015 | Reese |
| 2017/0190418 A1 | 7/2017 | Patten et al. |
| 2018/0118326 A1* | 5/2018 | Stockett ............... B64C 3/18 |
| 2018/0229469 A1 | 8/2018 | Zhao et al. |
| 2018/0273174 A1* | 9/2018 | Gifford ............... B64F 5/00 |
| 2018/0355842 A1* | 12/2018 | Badger ............... B33Y 80/00 |
| 2019/0100305 A1 | 4/2019 | Patten et al. |
| 2019/0152576 A1 | 5/2019 | Singer |
| 2019/0299522 A1 | 10/2019 | Chapiro et al. |
| 2020/0279495 A1 | 9/2020 | von Flotow et al. |
| 2020/0324892 A1 | 10/2020 | Benedict et al. |
| 2021/0363961 A1* | 11/2021 | Hall ............... F03D 7/022 |
| 2022/0017204 A1* | 1/2022 | Helou, Jr. ............... B64C 1/22 |

FOREIGN PATENT DOCUMENTS

| | | |
|---|---|---|
| CN | 101508343 A | 8/2009 |
| CN | 203544368 U | 4/2014 |
| CN | 103770342 B | 4/2016 |
| CN | 103317732 A | 8/2016 |
| CN | 205799931 U | 12/2016 |
| CN | 106671402 A | 5/2017 |
| CN | 206446681 U | 8/2017 |
| CN | 208149467 U | 11/2018 |
| CN | 108438218 B | 9/2020 |
| EP | 2220364 A1 | 8/2010 |
| EP | 2687548 B1 | 1/2014 |
| EP | 2765155 B1 | 8/2014 |
| EP | 3044264 B1 | 7/2016 |
| EP | 3090172 B1 | 11/2017 |
| EP | 3470335 A1 | 4/2019 |
| EP | 3706981 A1 | 9/2020 |
| IN | 00509DE2015 A | 2/2016 |
| IN | 201641014265 | 10/2017 |
| JP | 6519611 B2 | 5/2019 |
| KR | 20180092594 A | 8/2018 |
| RU | 2567496 C1 | 11/2015 |
| WO | 2009013579 A2 | 1/2009 |

OTHER PUBLICATIONS

Comseal; Products Catalog; downloaded Dec. 21, 2021; Copyright © 2021 Comseal Limited. https://comsealcomposites.com/product/carbon-fibre-rod/.

"3D Print Strong Parts in Continuous Carbon Fiber"; YouTube; Aug. 13, 2019; https://www.youtube.com/watch?v=Knx4JTN-ppY.

Rock West Composites website; downloaded Dec. 21, 2021; © Rock West Composites, Inc. All Rights Reserved. https://www.rockwestcomposites.com/.

International Search Report and Written Opinion, dated Mar. 24, 2023, for related International Application No. PCT/US2022/053596 (13 pages).

\* cited by examiner

ADDITIVE MANUFACTURED AIRFRAME STRUCTURE HAVING A PLURALITY OF REINFORCEMENT ELEMENTS

CROSS REFERENCE TO RELATED APPLICATIONS

This application is a continuation of, and claims priority to, U.S. Ser. No. 18/103,992 filed Jan. 31, 2023 and titled "ADDITIVE MANUFACTURED AIRFRAME STRUCTURE HAVING A PLURALITY OF REINFORCEMENT ELEMENTS", which is a continuation of, and claims priority to, U.S. Ser. No. 17/559,829 filed Dec. 22, 2021, now U.S. Pat. No. 11,597,490 issued Mar. 7, 2023, and titled "ADDITIVE MANUFACTURED AIRFRAME STRUCTURE HAVING A PLURALITY OF REINFORCEMENT ELEMENTS", the entire contents of all of which are hereby incorporated by reference in their entirety.

FIELD

The present disclosure relates generally to an additive manufactured airframe structure that can include a wing, fuselage, payload bays, booms, rotor blades, propellers, landing gear, and/or other airframe component.

BACKGROUND

Additive manufacturing of parts is desirable as it provides the ability to rapidly change out parts and keep the stock of parts low. However, the current technology does not provide for assembling structures from several components without loss in one or more of the mechanical properties of the structure.

BRIEF DESCRIPTION OF THE DRAWINGS

The novel features of the disclosure are set forth with particularity in the appended claims. A better understanding of the features and advantages of the present inventive concept will be obtained by reference to the following detailed description that sets forth illustrative examples, in which the principles of the disclosure are utilized, and the accompanying drawings of which:

DETAILED DESCRIPTION

Figure 1:
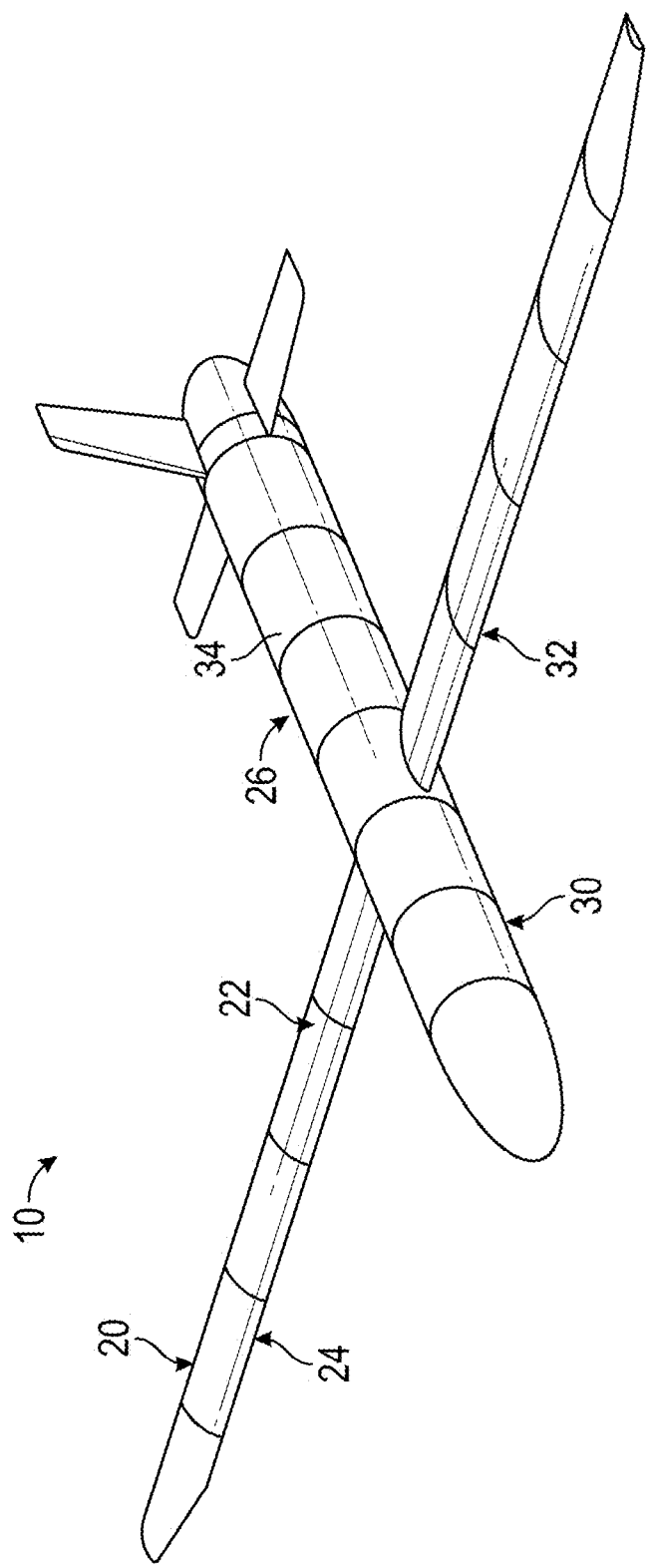
FIG. 1 illustrates an isometric view of an airframe including a plurality of airframe structures that have a plurality of additive manufactured airframe segments, according to at least one instance of the present disclosure.

As used herein, the terms "comprises," "comprising," "includes," "including," "has," "having" or any other variation thereof, are intended to cover a non-exclusive inclusion. For example, a process, product, article, or apparatus that comprises a list of elements is not necessarily limited only those elements but can include other elements not expressly listed or inherent to such process, process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

The term substantially, as used herein, is defined to be essentially conforming to the particular dimension, shape or other word that substantially modifies, such that the component need not be exact. For example, substantially cylindrical means that the object resembles a cylinder, but can have one or more deviations from a true cylinder.

The term "coupled" is defined as connected, whether directly or indirectly through intervening components, and is not necessarily limited to physical connections. The connection can be such that the objects are permanently connected or releasably connected. The term "comprising" means "including, but not necessarily limited to"; it specifically indicates open-ended inclusion or membership in a so-described combination, group, series and the like.

The present disclosure solves the problem of conventional structures built using additive manufacturing being either too weak or heavy for use in desired applications.

The present technology can be implemented in vehicles including boats, floating vessels, submersibles, and aircraft. Additionally, the present technology can be implemented with projectiles, ordinance, rockets, missiles, and/or other objects designed to move through air, space, and/or water.

The present disclosure uses aircraft as the example, but other structures can be assembled using the technology. Specifically, an airframe can include one or more airframe structures that are formed using one or more assembled airframe components. The subject of the application is the assembled airframe components and airframe structures that are made from a plurality of additive manufactured airframe segments. Other technologies use very expensive materials such as carbon fiber which do not allow for easy development and implementation with standard additive manufacturing materials. The present technology uses additive manufacturing combined with reinforcement elements to provide both the necessary shear strength, tensile strength, and compressive strength.

The present disclosure presents an additive manufactured structure. The additive manufactured structure can include a plurality of additive manufactured components operable to be linked together in an assembled direction. Additionally, the additive manufactured structure includes a plurality of reinforcement elements operable to be received in a receiving portion of the plurality of manufactured components and extending through the plurality of manufactured components in a normal direction. The receiving portion of the plurality of manufactured components is located on an interior of a corresponding one of the plurality of manufactured components. The receiving portion forms a substantially hollow portion for receiving the respective reinforcement elements. The reinforcement elements can be rod shaped and/or tube shaped. The reinforcement elements can be carbon fiber and/or pultruded. In other examples, the reinforcement elements can be fiberglass, E glass, S glass, aramid, metallic, and/or wood.

FIG. 1 illustrates an isometric view of an airframe 10 including a plurality of airframe structures 20 that have a plurality of additive manufactured airframe segments 30, according to at least one instance of the present disclosure. The airframe 10 includes a plurality of assembled air frame components 22. The plurality of assembled airframe components 22 can a wing 24 and/or a fuselage 26. Other airframe components 22 can also include formers, bulkheads, ailerons, elevators, rudders, stabilizers, spoilers, tabs, slats, and/or ribs. Each of the assembled airframe structures 20 can include a plurality of additive manufactured airframe segments 30. The illustrated airframe segments 30 can include wings segments 32 and/or fuselage segments 34. As illustrated, the airframe 10 can be built using these plurality of airframe segments 30 in an assembled configuration. In order to explain the present disclosure in more detail, FIGS. 2-8 illustrate wing segments 32 and FIGS. 9-14 illustrate fuselage segments 34. In the manufacturing of the airframe segments 30, a receiving portion of the airframe segments 30 is formed. The receiving portion is illustrated with respect to the wing segment 32 and/or fuselage segment 26 below. The receiving portion is located on the interior of the airframe segment 30. In at least one example, the receiving portion extends through the airframe segments 30.

The example in FIG. 1 does not include a motive force such as a jet engine or propeller. However, the present technology can be implemented with the desired motive force. Additionally, the present technology can be provided without a motive force such that the airframe 10 can be configured as a glider.

Figure 2:
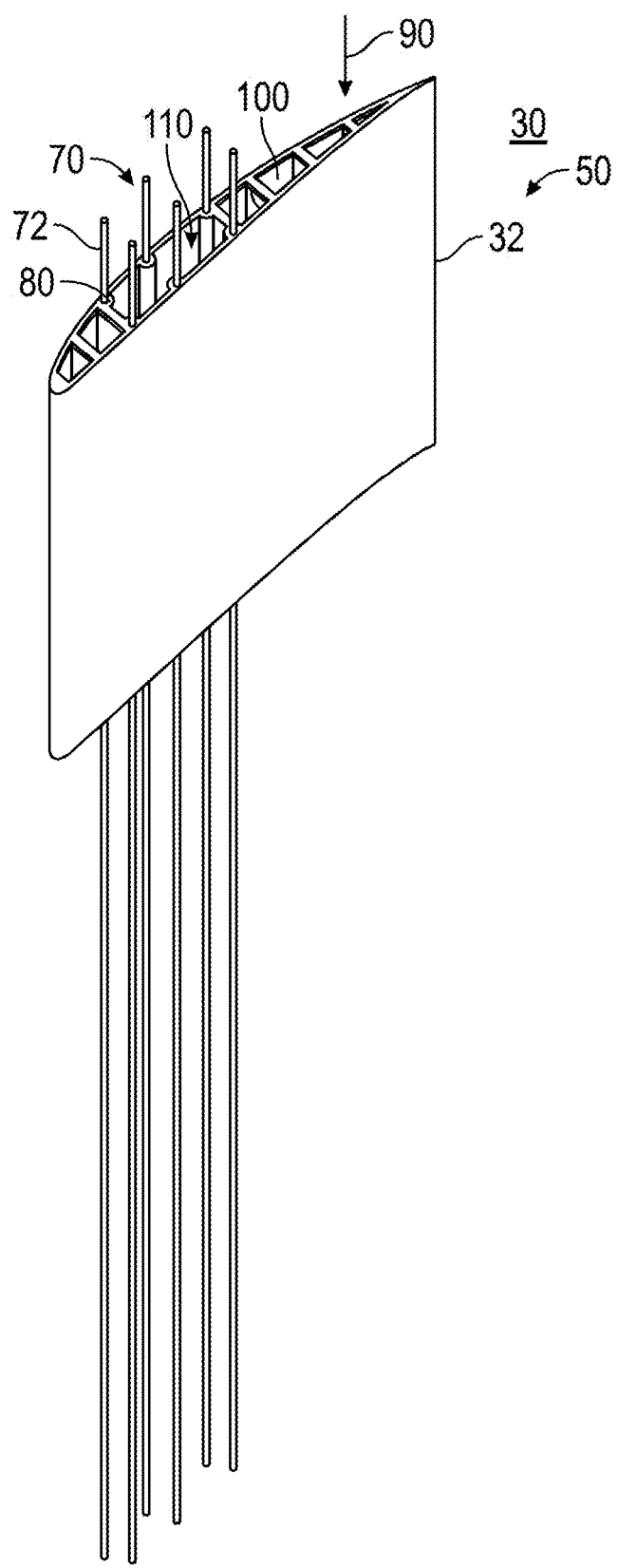
FIG. 2 illustrates an isometric view of a wing segment having a plurality of reinforcement elements extending therethrough, in an unassembled configuration, according to at least one instance of the present disclosure.

FIG. 2 illustrates an isometric view of a wing segment 32 having a plurality of reinforcement elements 70 extending therethrough, in an unassembled configuration 50, according to at least one instance of the present disclosure. A single wing segment 32 is made using an additive manufacturing process. The additive manufacturing process can include using a three dimensional (3D) printer to make the wing segment 32. The wing segment 32 can be manufactured such that it has an interior 100. As illustrated, the wing segment 32 forms at least one hollow interior chamber 110. When the wing segment 32 is being manufactured, a receiving portion 80 is formed in the interior 100 of the wing segment 32. In at least one example, the receiving portion 80 can extend through the interior 100 of the wing segment 32. In other examples, the receiving portion 80 can be formed at different points along the interior 100 of the wing segment 32.

Additionally, one or more reinforcement elements 70 can be provided. The reinforcement elements 70 can be operable to be received in a corresponding receiving portion 80. For example, the reinforcement elements 70 can be received in the receiving portion 80 and pass through the wing segment 32. As illustrated in FIG. 2, there are six different reinforcement elements 70. As illustrated, the reinforcement elements 70 extend through the wing segment 32 in a direction 90 that is normal to the wing segment 32. In at least one example, the reinforcement elements 70 can be tubes.

In the illustrated example, the reinforcement elements 70 can take the form of rods 72. The reinforcement elements 70 can be formed from different types of materials. In at least one example, the reinforcement elements 70 are made from a high strength material such as carbon fiber. In at least one example, the rods 72 can be carbon fiber rods. In another example, the rods 72 can be pultruded rods. In still another example, the rods 72 can be pultruded carbon fiber rods. In yet another example, the reinforcement elements 70 can be substantially beam shaped. The substantially beam shape can be one or more of an I-Beam or a wide flange beam. Additionally, the reinforcement elements 70 can be substantially shaped as a flat bar, angle, hexagonal, channel, tee bar, half round, half oval, and/or chamfer bar.

In other examples, the reinforcement elements 70 can be formed from fiberglass, E glass, S glass, aramid, metal, and/or wood.

Figure 3:
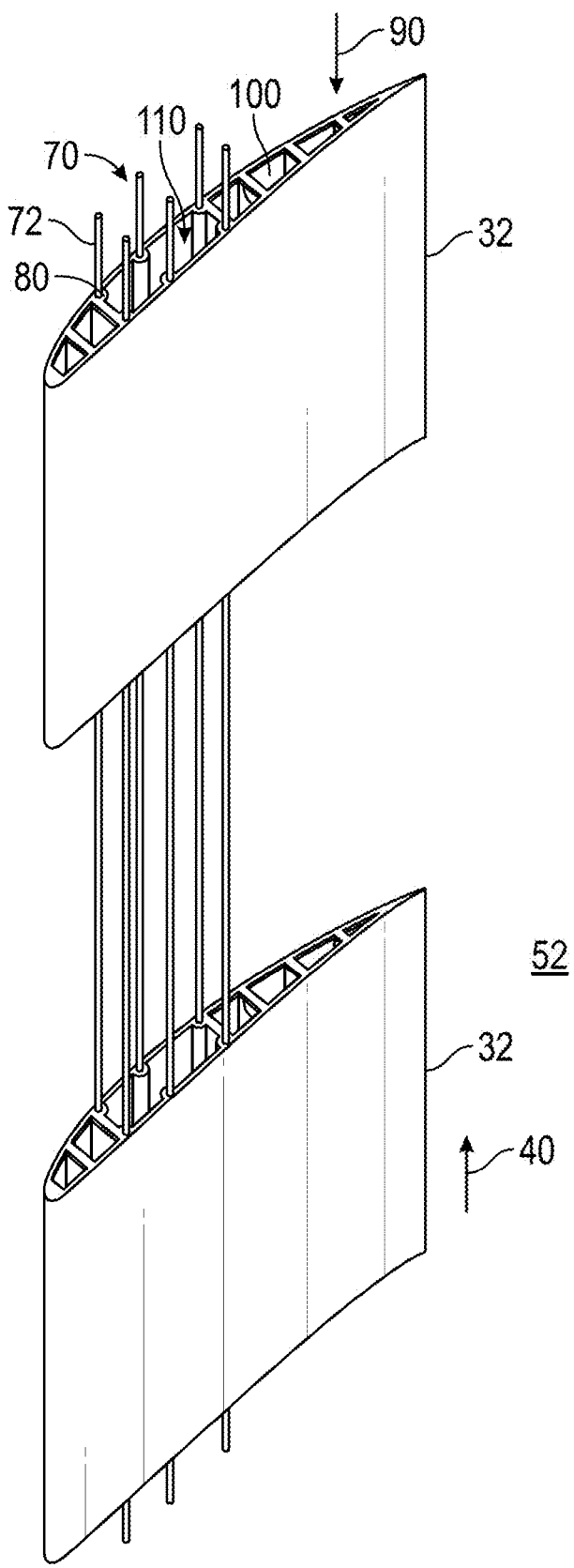
FIG. 3 illustrates an isometric view of a wing component having two wing segments in a partially assembled configuration, according to at least one instance of the present disclosure.

FIG. 3 illustrates an isometric view of a wing component 24 having two wing segments 32 in a partially assembled configuration 52, according to at least one instance of the present disclosure. As illustrated, the top wing segment 32 can be bonded to the reinforcement elements 70 in the respective receiving portion 80 of the wing segment 32. A second wing segment 32 can likewise receive the reinforcement elements 70 in respective receiving portions 80. The second wing segment 32 can be moved towards the first wing segment 32 in an assembled direction 40, where the second wing segment 32 eventually comes to be placed adjacent to the first wing segment 32. The second wing segment 32 can be moved towards the first wing segment 32 in the assembled direction 40 until the second wing segment 32 abuts against the first wing segment 32. The second wing segment 32 is not bonded to the reinforcement elements 70 until the second wing segment 32 is positioned adjacent to the first wing segment 32. The second wing segment 32 is formed independently of the first wing segment 32. The first wing segment 32 and second wing segment 32 are subsequently joined together, and the reinforcement elements 70 extend through both the first wing segment 32 and the first wing segment 32, thereby providing a continuous reinforcement elements 70 through the first and second wing segments 32.

Figure 4:
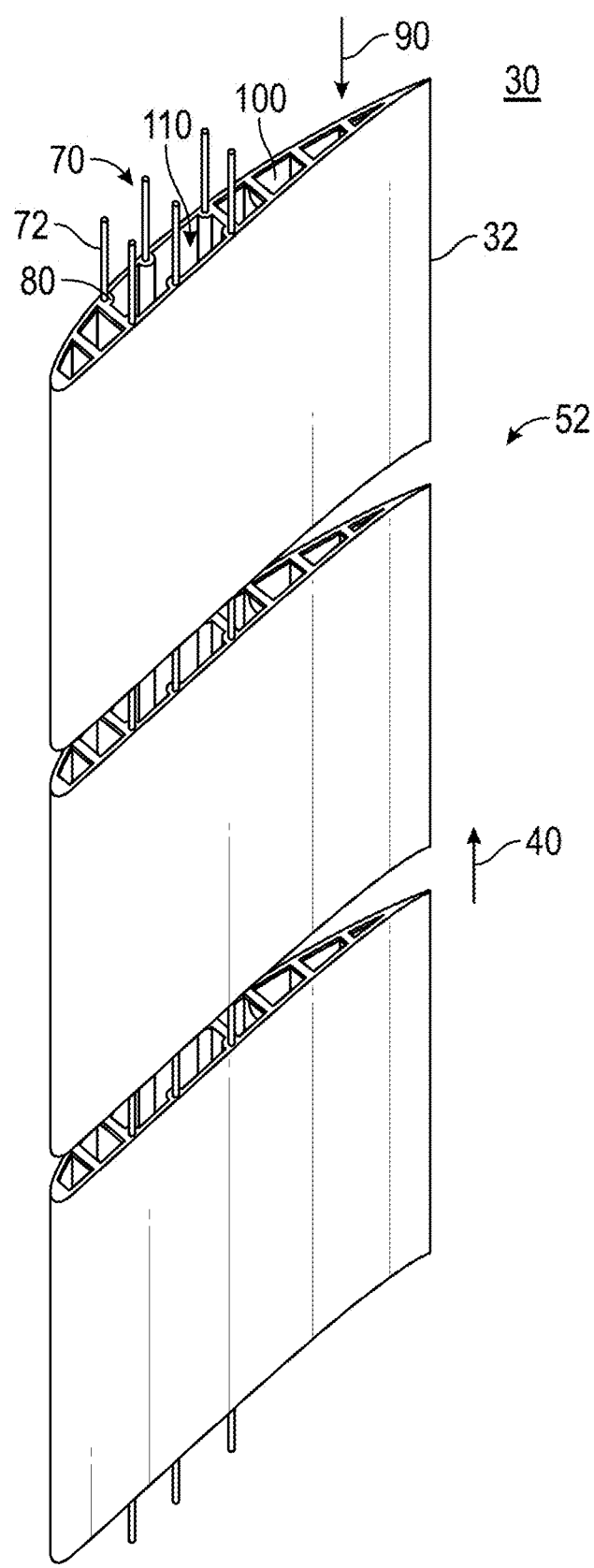
FIG. 4 illustrates an isometric view of a wing component having a plurality of wing segments in a partially assembled configuration, according to at least one instance of the present disclosure.

FIG. 4 illustrates an isometric view of a wing component 30 having a plurality of wing segments 32 in a partially assembled configuration 52, according to at least one instance of the present disclosure. The first wing segment 32 can remain stationary and the second wing segment 32 and third wing segment 32 can be moved towards the first wing segment 32. As illustrated, the reinforcement elements 70 extend through the first wing segment 32, the second wing segment 32, and third wing segment 32. As the same reinforcement elements 70 extend through all three of the wing segments 32, the reinforcement elements 70 can provide the desired tensile and compressive strength that is need for a given wing component 24. Thus, the reinforcement elements 70 provide a continuous reinforcement element 70 through the plurality of wing segments 32.

Figure 5:
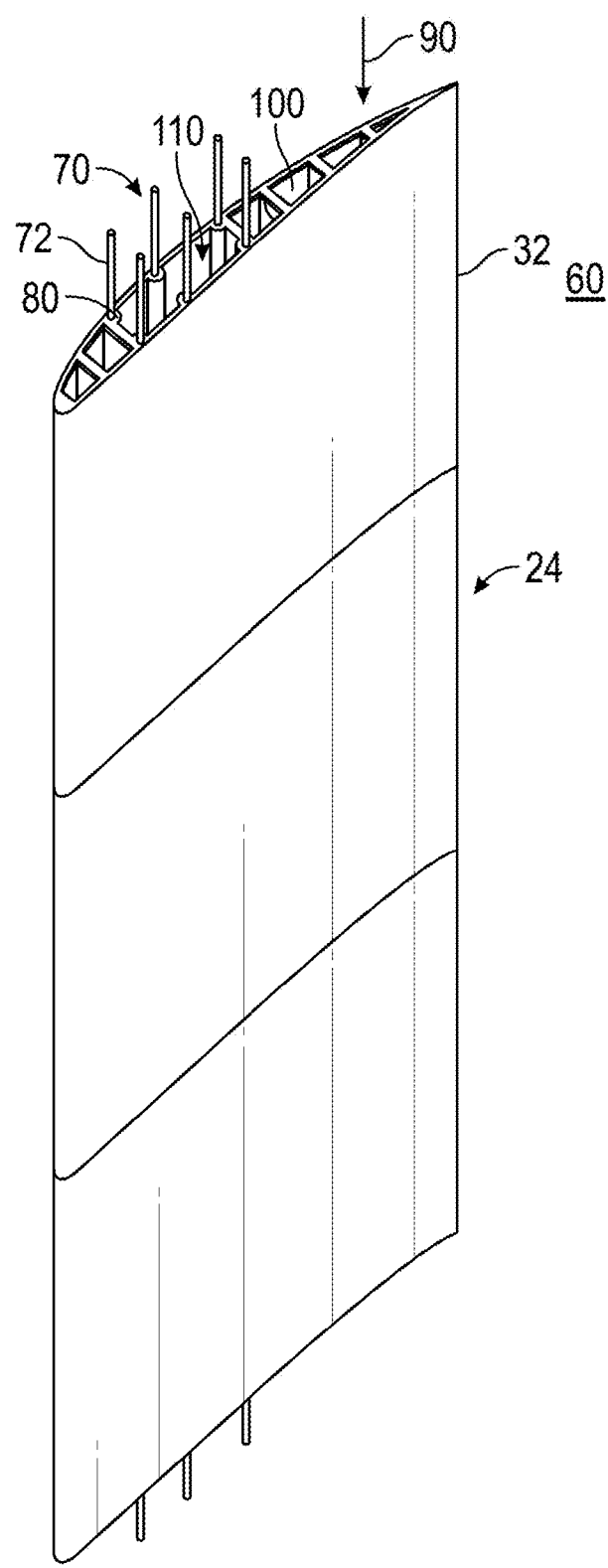
FIG. 5 illustrates an isometric view of a wing component having a plurality of wing segments in an assembled configuration, according to at least one instance of the present disclosure.

FIG. 5 illustrates an isometric view of a wing component 24 having a plurality of wing segments 32 in an assembled configuration 60, according to at least one instance of the present disclosure. As seen in FIG. 5, each of the wing segments 32 are adjacent one another. In at least one example, each of the wing segments 32 can abut against one another in a series. The wing segments 32 are bonded or affixed to the reinforcement elements 70 within the receiving portion 80 of the wing segments 32. As described above, the receiving portion 80 is formed within the interior of the respective one of wing segments 32. In particular, the receiving portion 80 is formed within a hollow interior chamber 110 of the wing segment 32.

The above examples have been described in relation to three different wing segments 32. In other examples, the number of wing segments 32 is at least two and can be any number. For example, as illustrated in FIG. 1 each wing component 24 includes five different wing segments 32. Each of the wing segments 32 can have a different shape and design based on the location along the wing component 24.

Figure 6:
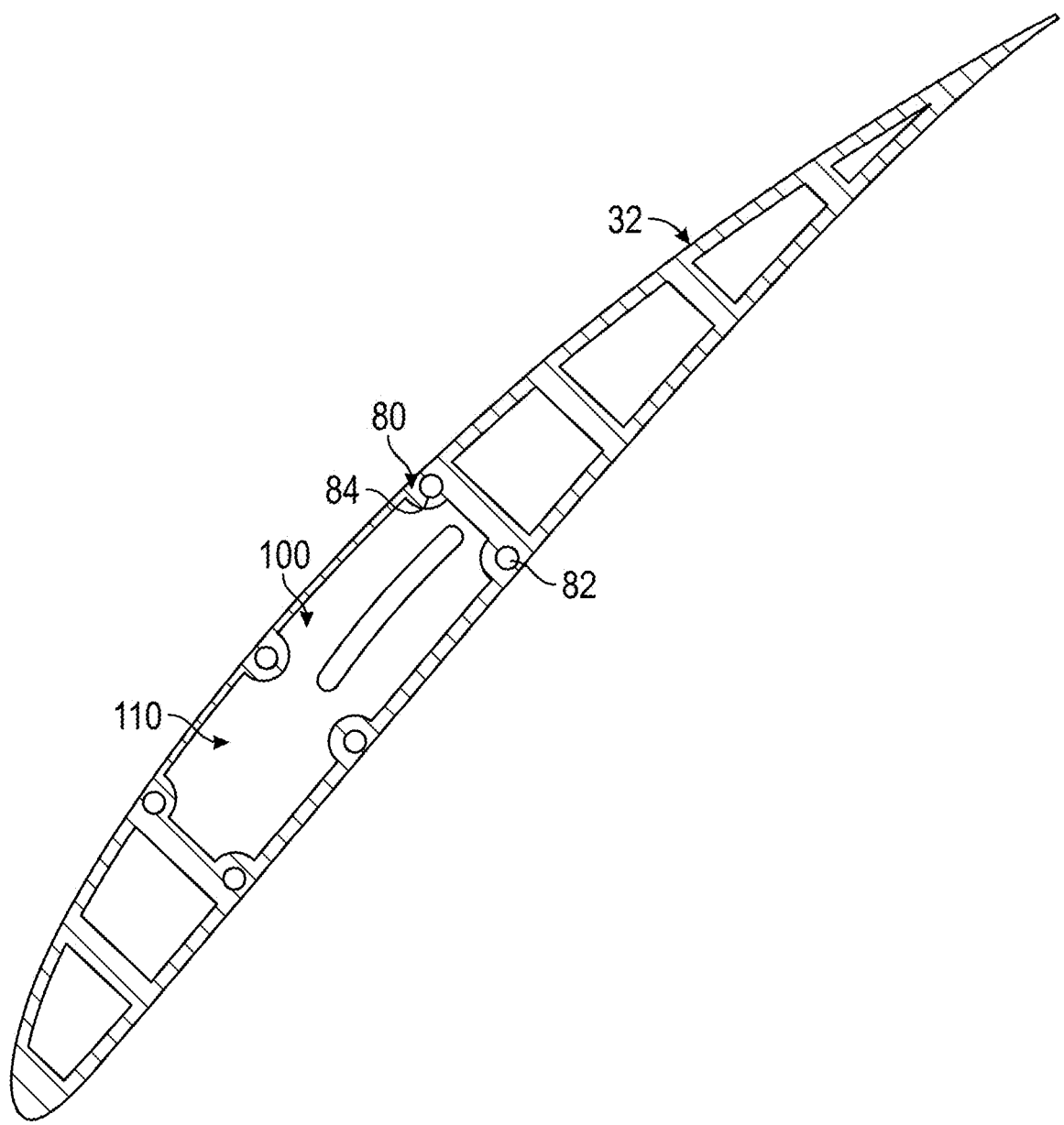
FIG. 6 illustrates a cross-sectional view of a wing segment, according to at least one instance of the present disclosure.
Figure 7:
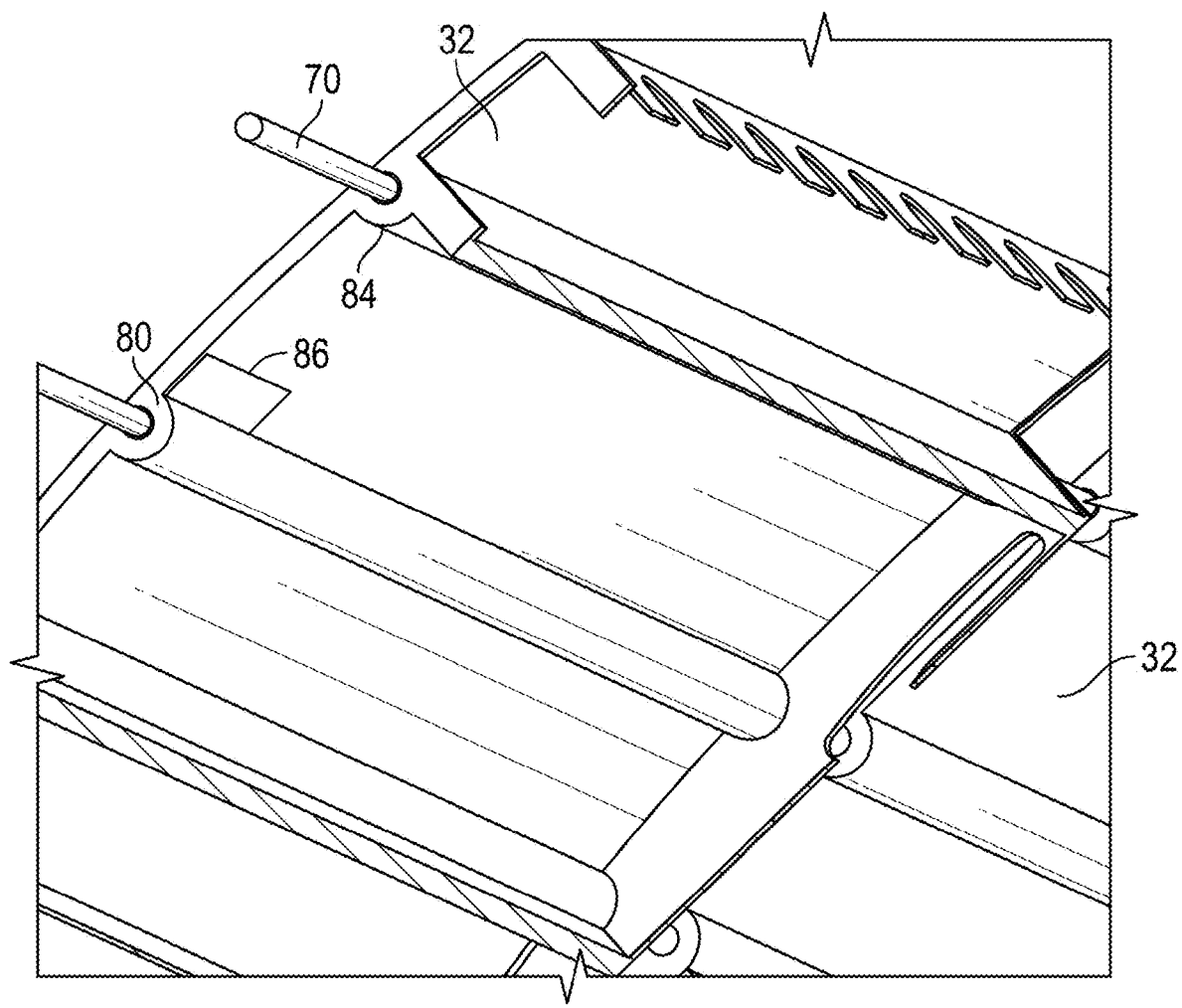
FIG. 7 illustrates an isometric cross-sectional partial view of a pair of wing segments, according to at least one instance of the present disclosure.
Figure 8:
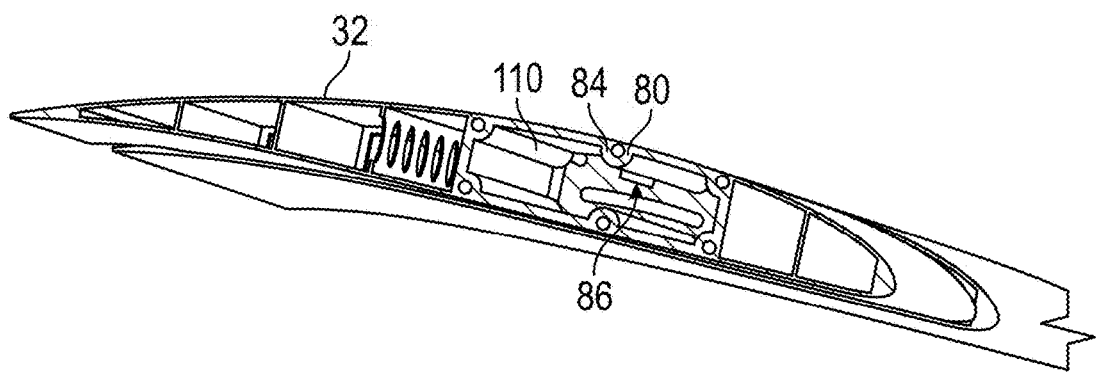
FIG. 8 illustrates an isometric cross-sectional view of a wing segment, according to at least one instance of the present disclosure.

In order to further illustrate the receiving portion 80, FIGS. 6-8 illustrate different views of one of the wing segments 32.

FIG. 6 illustrates a cross-sectional view of a wing segment 32, according to at least one instance of the present disclosure. The cross-sectional view is illustrative and the cross-section of a particular wing segment 32 can vary along its length. As illustrated, the cross-section of the wing segment forms an interior 100. Additionally, in at least the illustrated example, one or more hollow interior chambers 110 can be formed by the wing segment 32. A plurality of receiving portions 80 are formed during manufacturing of the wing segment 32. As illustrated, the plurality of receiving portions 80 are formed within the same hollow interior chamber 110. In other examples, the plurality of receiving portions 80 can be formed within other ones of the hollow interior chambers 110. Each of the receiving portions 80 form a substantially hollow portion 82 that is configured to receive a reinforcement element (not shown). In at least one example, the substantially hollow portion 82 can include a channel. In at least one example, the hollow portion 82 can be formed through the entirety of the wing segment 32. In one example, the receiving portion 80 can take the form of a tab 84. The tab 84 extends inwardly such that the substantially hollow portion 82 extends within the interior 100 of the wing segment 32. In one example, the shape of the tab 84 can be arcuate.

FIG. 7 illustrates an isometric cross-sectional partial view of a pair of wing segments 32, according to at least one instance of the present disclosure. The wing segments 32 include receiving portions 80 that can be in the shape of tabs 84. The receiving portions 80 can be substantially cylindrical shaped on the exposed sides. The reinforcement element 70 can extend in the receiving portion 80. In some examples, the reinforcement element 70 can extend through the receiving portion 80. The reinforcement elements 70 can be bonded along the entire length of the receiving portion 80. In other examples, the reinforcement element 70 can be bonded only in a section 86 of the receiving portion 80. In at least one example, the section 86 of the receiving portion 80 in which the reinforcement element 70 is bonded abuts an end of the wing segment 32. In at least one example, the reinforcement element 70 can be bonded to the receiving portion 80 at two different sections 86—one of the two different sections 86 being at a first end of the wing segment 32, and the other of the two different sections 86 being at an opposite end of the wing segment 32.

FIG. 8 illustrates an isometric cross-sectional view of a wing segment 32, according to at least one instance of the present disclosure. As illustrated, the wing segment 32 includes a receiving portion 80 that can be shaped as a tab 84 that extends into a hollow interior chamber 110 of the wing segment 32.

Figure 9:
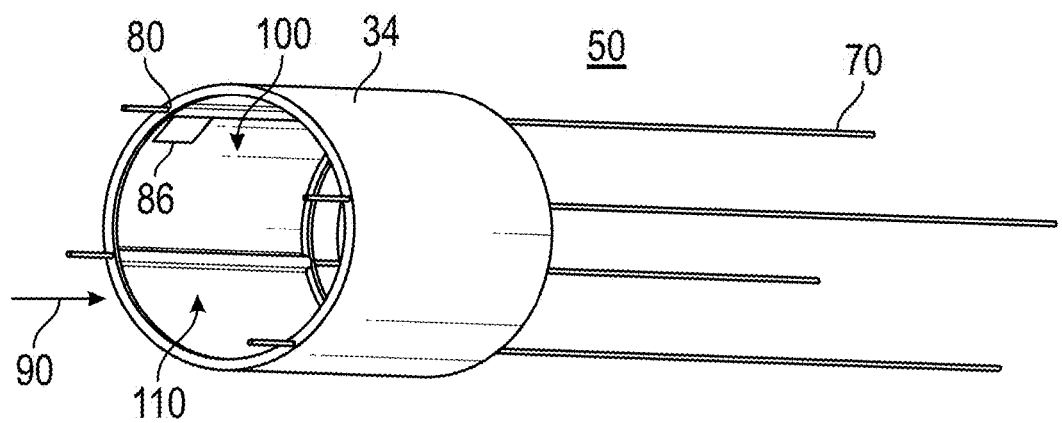
FIG. 9 illustrates an isometric view of a fuselage segment in an unassembled configuration, according to at least one instance of the present disclosure.
Figure 10:
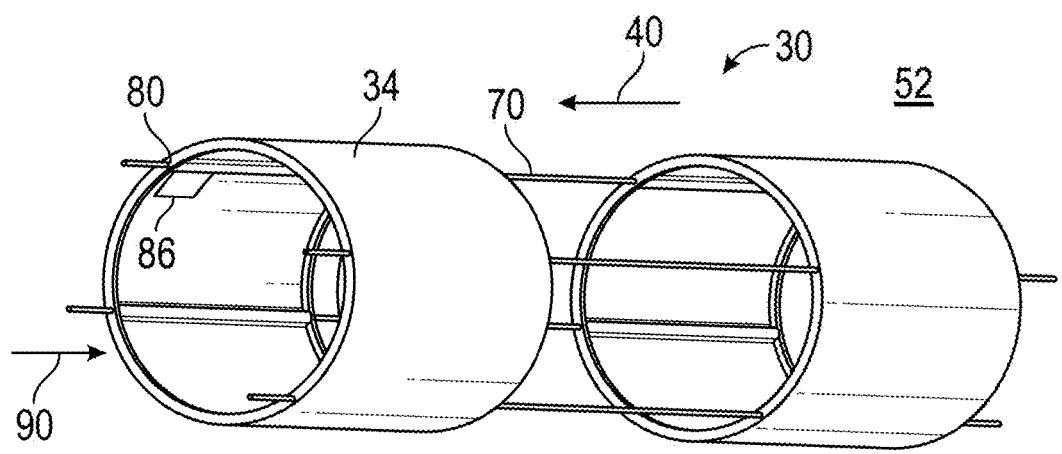
FIG. 10 illustrates an isometric view of two of fuselage segments in a partially assembled configuration, according to at least one instance of the present disclosure.
Figure 11:
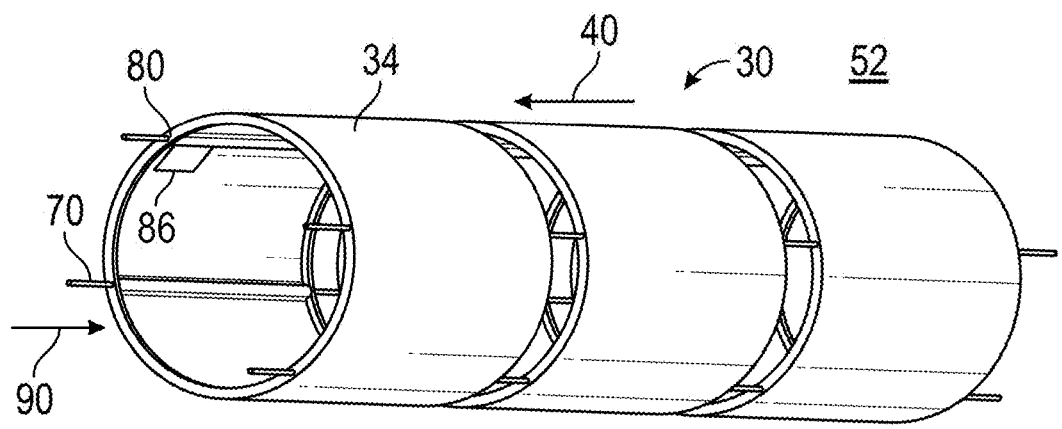
FIG. 11 illustrates an isometric view of a plurality of fuselage segments in a partially assembled configuration, according to at least one instance of the present disclosure.
Figure 12:
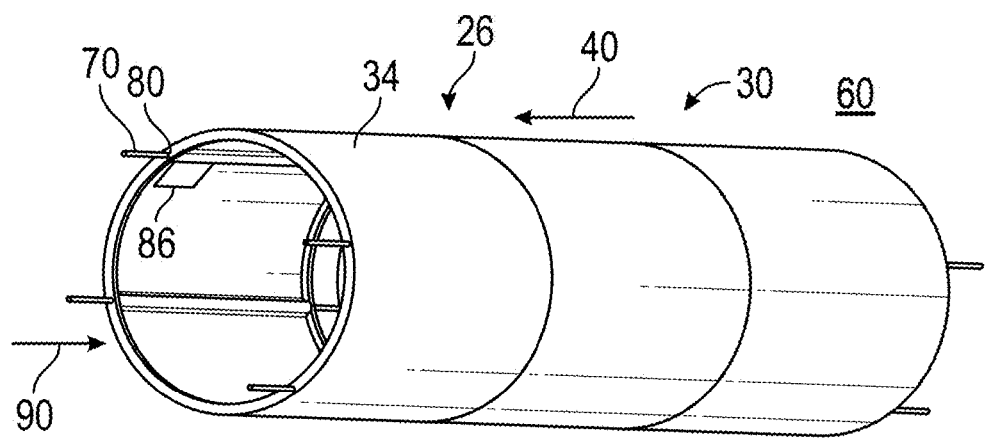
FIG. 12 illustrates an isometric view of a plurality of fuselage segments in an assembled configuration, according to at least one instance of the present disclosure.

FIG. 9 illustrates an isometric view of a fuselage segment 34 in an unassembled configuration 50, according to at least one instance of the present disclosure. In the unassembled configuration 50 that is illustrated, a single fuselage segment 34 has a plurality of reinforcement elements 70 that extend therethrough. The plurality of reinforcement elements 70 can extend through the fuselage segment 34 in a direction 90 normal to the fuselage segment. The fuselage segment 34 forms at least one receiving portion 80 in the interior of the fuselage segment 34 operable to receive a corresponding one of the reinforcement elements 70. The at least one receiving portion 80 can extend into a hollow interior chamber 110 formed by the fuselage segment 34. The reinforcement element 70 can be bonded to the at least one receiving portion 80. In one example, a section 86 of the receiving portion 80 can be the location at where the reinforcement element 70 is bonded inside the receiving portion 80. FIGS. 10-12 present the creation of a fuselage component 26. As illustrated, the fuselage component 26 includes a plurality of additive manufactured airframe segments in the form of fuselage segments 34.

FIG. 10 illustrates an isometric view of two of fuselage segments 34 in a partially assembled configuration 52, according to at least one instance of the present disclosure. The first fuselage segment 34 can have the reinforcement elements 70 bonded to the receiving portion 80 at section 86. As the reinforcement elements 70 extend through the fuselage segments 34 in a normal direction 90, a second fuselage segment 34 can receive the reinforcement elements 70 therethrough. The second fuselage segment 34 can be moved towards the first fuselage segment 54 in an assembled direction 40. The present technology provides the creation of a plurality fuselage segments 34 that are separate and independent from one another. Once the plurality of fuselage segments 34 are created, the plurality of fuselage segments 34 can receive a plurality of reinforcements elements 70 therethrough in a normal direction 90. The plurality of fuselage segments 34 can be moved towards a first one of the plurality of fuselage segments 34 in an assembled direction 40. The plurality of fuselage segments 34 can be moved towards the first one of the plurality of fuselage segments 34 in the assembled direction 40 until the plurality of fuselage segments 34 abut against one another in a series.

FIG. 11 illustrates an isometric view of a plurality of fuselage segments 34 in a partially assembled configuration 52, according to at least one instance of the present disclosure. Moving from FIG. 10 to FIG. 11, the second fuselage segment 34 moves towards the first fuselage segment 34 in an assembled direction to accommodate a third fuselage segment 34 receiving the plurality of reinforcement elements 70 and likewise moving toward the first fuselage segment 34 in an assembled direction.

FIG. 12 illustrates an isometric view of a plurality of fuselage segments 34 in an assembled configuration 60, according to at least one instance of the present disclosure. Once the plurality of fuselage segments 34 are positioned in the assembled configuration 60 (e.g., abut against one another), the plurality of fuselage segments 34 can be bonded with the reinforcement elements 70 at a section 86 of the receiving portion 80. Only the section 86 of one of the receiving portions 80 is illustrated for clarity purposes. In some examples, the section 86 can be the same length for each respective one of the receiving portions 80. In other examples, the section 86 can vary depending upon the location of the respective receiving portion 80. The section 86 can likewise be located at both ends of the receiving portion 80 for a given fuselage segment 34. In the assembled configuration 60, the plurality of fuselage segments form a fuselage component 26.

Figure 13:
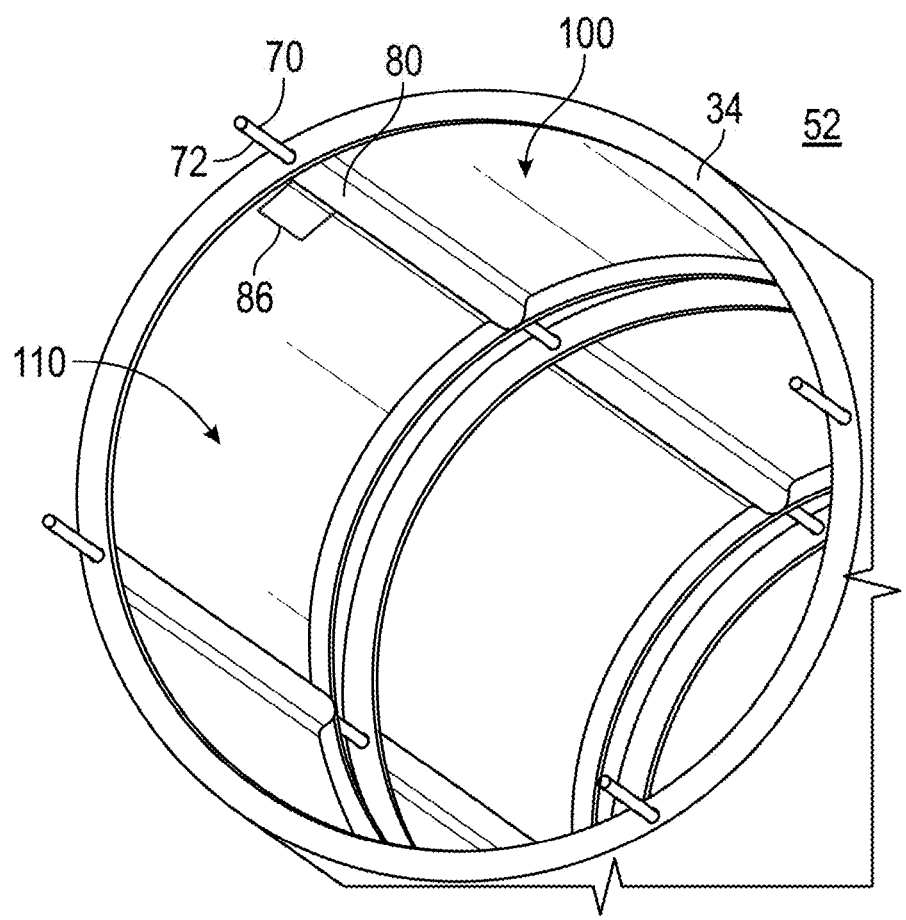
FIG. 13 illustrates another isometric view of a plurality of fuselage segments in a partially assembled configuration, according to at least one instance of the present disclosure.

In order to illustrate the receiving portion 80 and section 86 clearer, FIG. 13 illustrates another isometric view of a plurality of fuselage segments 34 in a partially assembled configuration 52, according to at least one instance of the present disclosure. The receiving portion 80 is located on an interior 100 of the respective one of the fuselage segments 34. The receiving portion 80 extends into a hollow chamber 110 that is formed by the fuselage segment 34. As illustrated the receiving portion 80 can have an exposed shape that is substantially cylindrical.

As illustrated the reinforcement elements 70 can be rods 72. In one example, the rods 72 can be carbon fiber rods. In yet another example, the rods can be pultruded rods. In still another example, the rods 72 can be pultruded carbon fiber rods. In other examples, the reinforcement elements 70 can be tubes such that an interior is hollow.

The rods 72 can be bonded to at least a section 86 of the respective receiving portion 80 through adhesion, whereby the plurality of fuselage segments 34 can form an assembled fuselage component 26, as illustrated in FIG. 12. In other examples, the reinforcement elements 70 can be bonded to at least a section of the respective receiving portions 80 through one of adhesion, pressure fit, or friction fit, whereby the plurality of additive manufactured airframe segments form an assembled airframe component.

Figure 14:
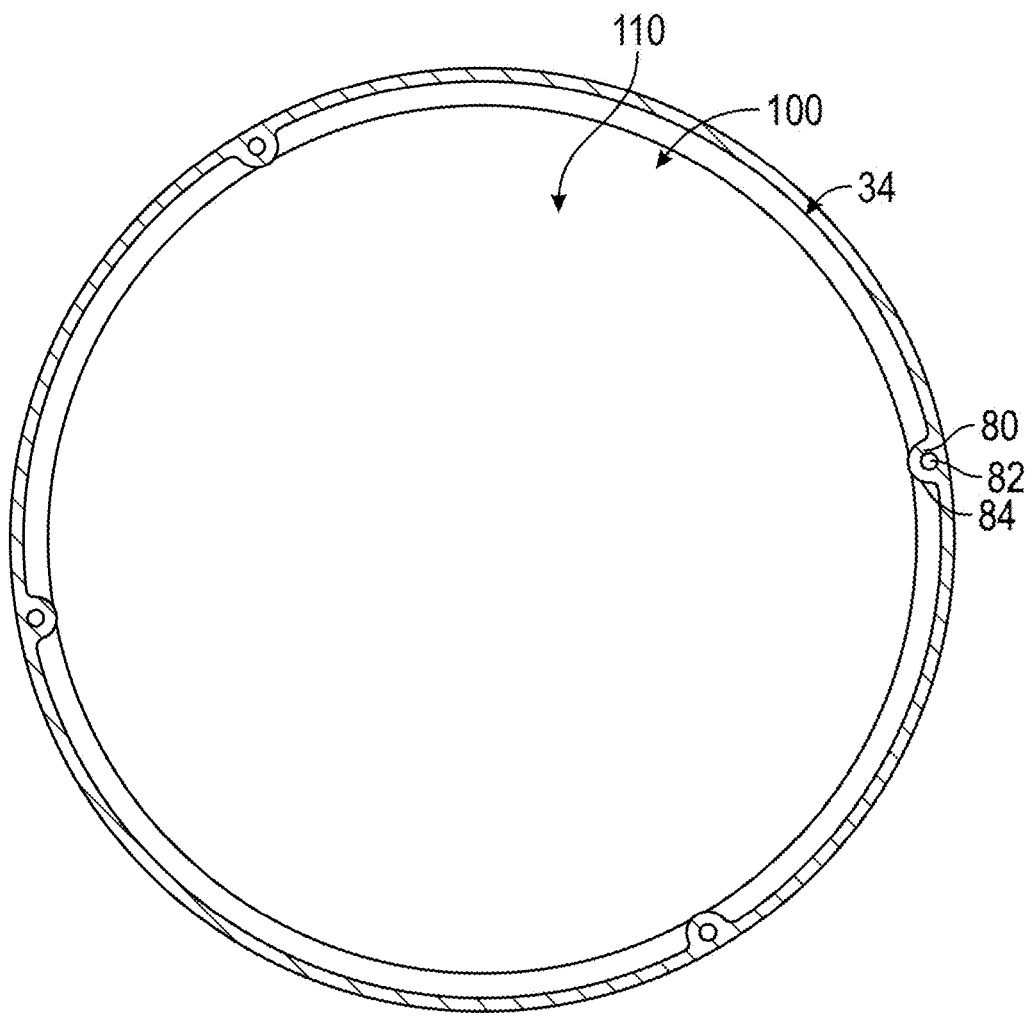
FIG. 14 illustrates a cross-sectional view of one of the plurality of fuselage segments, according to at least one instance of the present disclosure.

FIG. 14 illustrates a cross-sectional view of one of the plurality of fuselage segments 34, according to at least one instance of the present disclosure. The receiving portion 80 is located on an interior 100 of the fuselage segment 34. The receiving portion 80 extends into a hollow chamber 110 that is formed by the fuselage segment 34. As illustrated the receiving portion 80 can have an exposed shape that is substantially cylindrical. Additionally, the receiving portion 80 forms a substantially hollow portion 82 for receiving the reinforcement element. The hollow portion 82 can be a channel that runs through the fuselage segment 34. The substantially hollow portion 82 can be shaped to receive the desired reinforcement element. The creation of the substantially hollow portion 82 can be controlled during the additive manufacturing process.

Figure 15:
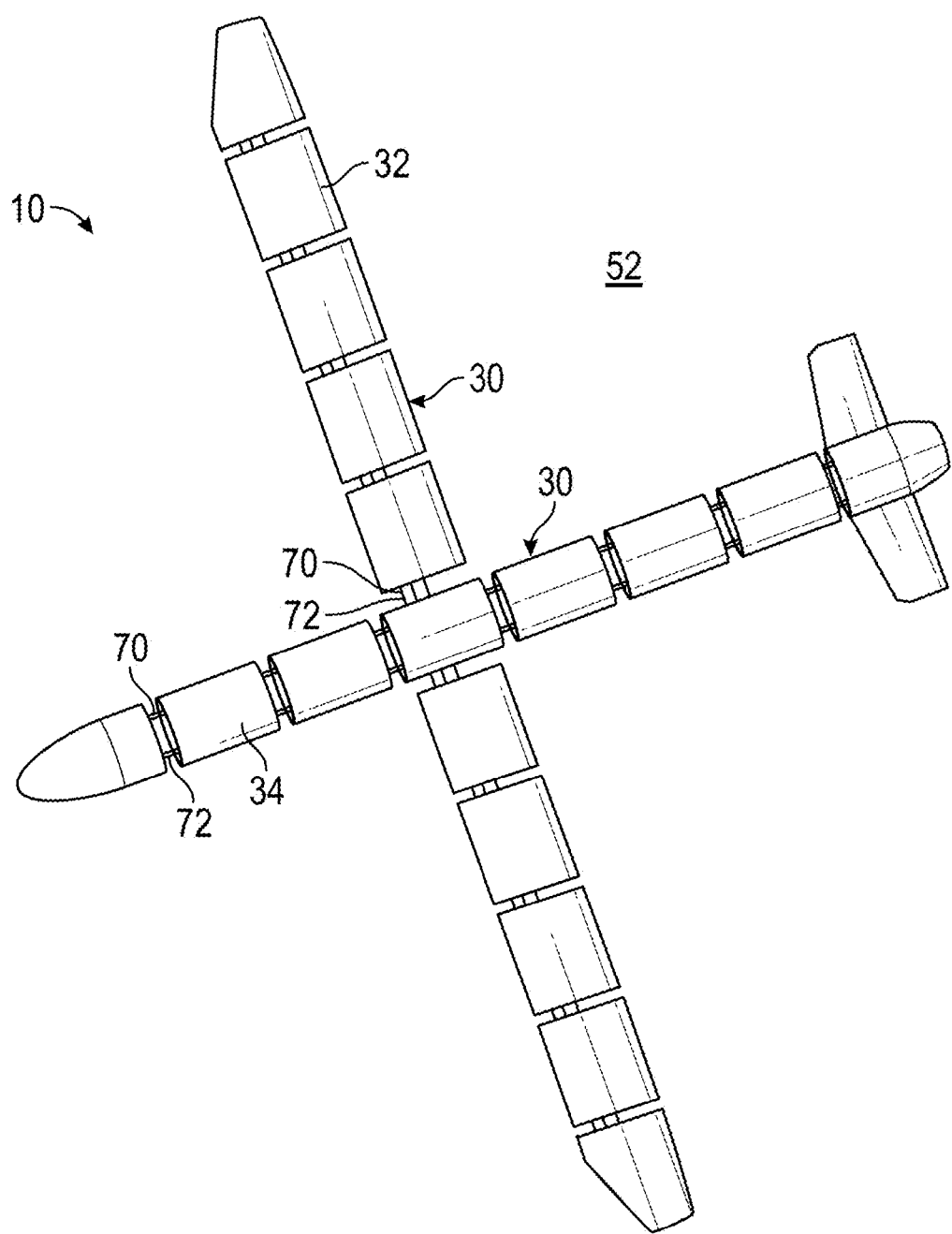
FIG. 15 illustrates an isometric view of an airframe including a plurality of airframe structures that have a plurality of additive manufactured airframe segments in a partially assembled configuration, according to at least one instance of the present disclosure.

FIG. 15 illustrates an isometric view of an airframe 10 including a plurality of additive manufactured airframe segments 30 in a partially assembled configuration 52, according to at least one instance of the present disclosure. As illustrated, a plurality of reinforcement elements 70 extend through both the wing segments 32 and fuselage segments 34. The reinforcements elements 70 can be rods 72. The partially assembled configuration 52 shown can be converted into an assembled configuration once the plurality of additive manufactured airframe segments 30 are positioned into an assembled orientation and bonded to the reinforcement elements according to the above described examples.

While preferred examples of the present inventive concept have been shown and described herein, it will be obvious to those skilled in the art that such examples are provided by way of example only. Numerous variations, changes, and substitutions will now occur to those skilled in the art without departing from the disclosure. It should be understood that various alternatives to the examples of the disclosure described herein can be employed in practicing the disclosure. It is intended that the following claims define the scope of the disclosure and that methods and structures within the scope of these claims and their equivalents be covered thereby.

Illustrative examples of the disclosure include:

Aspect 1: An additive manufactured airframe structure comprising: a plurality of additive manufactured airframe segments operable to be linked together in an assembled direction, wherein each of the plurality of additive manufactured airframe segments are separate from one another in an unassembled configuration; a plurality of reinforcement elements operable to be received in a receiving portion of the plurality of airframe segments and extending through the plurality of airframe segments in a normal direction; wherein the receiving portion is located on the interior of a respective one of the plurality of airframe segments.

Aspect 2: The additive manufactured airframe structure of Aspect 1, wherein each of the plurality of additive manufactured airframe segments form one or more hollow interior chambers and the receiving portion being adjacent to at least one of the one or more hollow interior chambers.

Aspect 3: The additive manufactured airframe structure of Aspect 2, wherein the receiving portion forms a substantially hollow portion corresponding in size to one of the plurality of reinforcement elements.

Aspect 4: The additive manufactured airframe structure of any Aspects 2 to 3, wherein the receiving portion is formed as a tab that extends into the at least one of the one or more hollow interior chambers.

Aspect 5: The additive manufactured airframe structure of any Aspects 1 to 4, wherein the plurality of reinforcement elements are substantially rods.

Aspect 6: The additive manufactured airframe structure of Aspect 5, wherein the rods are carbon fiber rods.

Aspect 7: The additive manufactured airframe structure of any Aspects 5 to 6, wherein the rods are pultruded rods.

Aspect 8: The additive manufactured airframe structure of any Aspects 5 to 7, wherein the rods are bonded to at least a section of respective receiving portions through adhesion, whereby the plurality of additive manufactured airframe segments form an assembled airframe component.

Aspect 9: The additive manufactured airframe structure of Aspect 8, wherein the assembled airframe component is a wing.

Aspect 10: The additive manufactured airframe structure of any Aspects 1 to 4, wherein the plurality of reinforcement elements are one of a substantially rod shape, beam shape, and/or tube shape.

Aspect 11: The additive manufactured airframe structure of Aspect 10, wherein the plurality of reinforcement elements are made from carbon fiber, fiberglass, E glass, S glass, aramid, metal, and/or wood.

Aspect 12: The additive manufactured airframe structure of any Aspects 1 to 4, 10, and/or 11, wherein the plurality of reinforcements elements are bonded to at least a section of the respective receiving portions through one of adhesion, pressure fit, or friction fit, whereby the plurality of additive manufactured airframe segments form an assembled airframe component.

Aspect 10: The additive manufactured airframe structure of any one of Aspects 1 to 9, further comprising: a plurality of additive manufactured fuselage segments operable to be linked together in an assembled direction, wherein each of the plurality of additive manufactured fuselage segments are separate from one another in an unassembled configuration; a plurality of fuselage reinforcement elements operable to be received in a fuselage receiving portion of the plurality of fuselage segments and extending through the plurality of fuselage segments in a normal direction; wherein the fuselage receiving portion is located on the interior of the respective one of the plurality of fuselage segments.

Aspect 11: The additive manufactured airframe structure of Aspect 8, wherein the assembled airframe component is a fuselage.

Aspect 12: The additive manufactured airframe structure of any one of Aspects 1 to 11, wherein the plurality of reinforcement cylinders are tubes.

What is claimed is:

1. An additive manufactured airframe structure, comprising:
   a first additive manufactured fuselage segment comprising a first outer wall, wherein the first outer wall extends in a normal direction from a first end to a second end and circumferentially encloses a first hollow interior therewithin, the hollow interior extending in the normal direction;
   a plurality of reinforcement elements extending from the second end of, and away from, the first outer wall in the normal direction; and
   a second additive manufactured fuselage segment formed separately from the first additive manufactured fuselage segment and comprising:
      a second outer wall, wherein the second outer wall extends in the normal direction from a first end to a second end and circumferentially encloses a second hollow interior therewithin, the second hollow interior extending in the normal direction; and
      a plurality of receiving channels extending along the second outer wall, wherein the plurality of reinforcement elements are received in the plurality of receiving channels and link together the first and second additive manufactured fuselage segments.

2. The additive manufactured airframe structure according to claim 1, wherein the second outer wall further comprises a plurality of interiorly extending portions additively manufactured with the second additive manufactured fuselage segment and extending interiorly from the second outer wall, and wherein the plurality of receiving channels are defined within the plurality of interiorly extending portions.

3. The additive manufactured airframe structure according to claim 1, wherein the first additive manufactured fuselage segment comprises an other plurality of receiving channels extending along the first outer wall, wherein the plurality of reinforcement elements are further received in the other plurality of receiving channels.

4. The additive manufactured airframe structure according to claim 1, wherein the plurality of reinforcement elements are tubes.

5. The additive manufactured airframe structure according to claim 1, wherein the plurality of reinforcement elements are bonded to at least a section of respective receiving channels of the plurality of receiving channels through adhesion.

6. The additive manufactured airframe structure according to claim 1, wherein the plurality of receiving channels depend from the first end of the second outer wall.

7. The additive manufactured airframe structure according to claim 6, wherein the second additive manufactured fuselage segment defines an end surface at the first end of the second outer wall, and wherein the plurality of receiving channels comprise openings extending through the end surface.

8. The additive manufactured airframe structure according to claim 1, wherein the plurality of reinforcement elements are rods.

9. The additive manufactured airframe structure according to claim 8, wherein the rods are carbon fiber rods.

10. The additive manufactured airframe structure according to claim 8, wherein the rods are pultruded rods.

11. A fuselage portion for an additive manufactured airframe structure, the fuselage portion comprising:
    a first additive manufactured fuselage segment comprising a first outer wall, wherein the first outer wall extends in a normal direction from a first end to a second end and circumferentially encloses a first hollow interior therewithin, the hollow interior extending in the normal direction;
    a plurality of receiving channels extending along the first outer wall; and
    a plurality of reinforcement elements received in the plurality of receiving channels and extending from the second end of, and away from, the first outer wall in the normal direction, wherein the plurality of reinforcement elements are configured to be received in an other plurality of receiving channels of a second additive manufactured fuselage segment and link together the first and second additive manufactured fuselage segments.

12. The fuselage portion according to claim 11, wherein the first outer wall further comprises a plurality of interiorly extending portions additively manufactured with the first additive manufactured fuselage segment and extending interiorly from the first outer wall, and wherein the plurality of receiving channels are defined within the plurality of interiorly extending portions.

13. The fuselage portion according to claim 11, wherein the plurality of reinforcement elements are tubes.

14. The fuselage portion according to claim 11, wherein the plurality of reinforcement elements are rods.

15. The fuselage portion according to claim 11, wherein the plurality of reinforcement elements are bonded to at least a section of respective receiving channels of the plurality of receiving channels through adhesion.

16. The fuselage portion according to claim 11, wherein the plurality of receiving channels extend between the first end and the second end of the first outer wall.

17. The fuselage portion according to claim 16, wherein the first additive manufactured fuselage segment defines an end surface at the first end of the first outer wall, and wherein the plurality of receiving channels comprise openings extending through the end surface.

18. A method of assembling an additive manufactured airframe structure, the method comprising:

aligning a plurality of receiving channels of a second additive manufactured fuselage segment with a plurality of reinforcement elements extending from a first additive manufactured fuselage segment, wherein the first additive manufactured fuselage segment includes a first outer wall, wherein the first outer wall extends in a normal direction from a first end to the second end and circumferentially encloses a first hollow interior therewithin, the hollow interior extending in the normal direction, and wherein the plurality of reinforcement elements extend from the second end of, and away from, the first outer wall in the normal direction; and moving the second additive manufactured fuselage segment towards the first additive manufactured fuselage segment in an assembled direction, wherein the plurality of reinforcement elements are received into the aligned plurality of receiving channels and link together the first and second additive manufactured fuselage segments.

19. The method according to claim 18, wherein the second additive manufactured fuselage segment includes a second outer wall, wherein the second outer wall extends in the normal direction from a first end to a second end and circumferentially encloses a second hollow interior therewithin, the second hollow interior extending in the normal direction, and wherein the plurality of receiving channels depend from the first end of the second outer wall.

20. The method according to claim 19, wherein the second additive manufactured fuselage segment defines an end surface at the first end of the second outer wall, and wherein the plurality of receiving channels include openings extending through the end surface.

* * * * *